United States Patent [19]

Haneishi et al.

[11] Patent Number: 5,739,185
[45] Date of Patent: Apr. 14, 1998

[54] CATIONIC ELECTRODEPOSITABLE COATING COMPOSITION AND COATING METHOD USING THE SAME

[75] Inventors: Hidehiko Haneishi; Masanobu Kudoh, both of Hiratsuka; Koji Kamikado, Yokohama, all of Japan

[73] Assignee: Kansai Paint Co., Ltd., Japan

[21] Appl. No.: 515,592

[22] Filed: Aug. 16, 1995

[30] Foreign Application Priority Data

Aug. 17, 1994 [JP] Japan .................................. 6-214323
Oct. 20, 1994 [JP] Japan .................................. 6-279688

[51] Int. Cl.⁶ ...................................................... C08L 63/00
[52] U.S. Cl. ........................... 523/415; 523/416; 523/417;
523/423; 525/123; 525/454; 525/455; 525/459;
525/460; 525/502; 525/504; 525/505; 525/528;
525/529
[58] Field of Search ................................... 523/415, 416,
523/417, 423; 525/123, 454, 455, 459,
460, 502, 504, 505, 528, 529

[56] References Cited

U.S. PATENT DOCUMENTS

| | | | |
|---|---|---|---|
| 4,031,050 | 6/1977 | Jerabek | 528/528 |
| 4,278,580 | 7/1981 | Schmolzer et al. | 525/507 |
| 4,761,337 | 8/1988 | Guagliardo et al. | 525/458 |
| 4,981,759 | 1/1991 | Nakatani et al. | 428/626 |
| 5,472,999 | 12/1995 | Kudoh et al. | 523/409 |
| 5,481,012 | 1/1996 | Midogohchi et al. | 525/459 |

FOREIGN PATENT DOCUMENTS

0545353A1  6/1993  European Pat. Off. .

OTHER PUBLICATIONS

*Database WPI*, AN 89-044158 (abstract of Japanese Patent Application 63-317695) (Dec. 1988).

*Primary Examiner*—Randy Gulakowski
*Attorney, Agent, or Firm*—Wenderoth, Lind & Ponack

[57] ABSTRACT

The present invention provides a cationic electrodepositable coating composition comprising:

[I] a polyurethane-modified epoxy resin-amine adduct obtained by a reaction of:
 (A) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule,
 (B) a bisphenol type epoxy resin having at least two epoxy groups in the molecule, and
 (C) an active-hydrogen-containing amine compound, and [II] a nonionic film-forming resin.

22 Claims, No Drawings

CATIONIC ELECTRODEPOSITABLE COATING COMPOSITION AND COATING METHOD USING THE SAME

The present invention relates to a novel electrodepositable coating composition. More particularly, the present invention relates to a cationic electrodepositable table coating composition capable of forming a coating film superior in weathering resistance, corrosion on resistance, etc.

With respect to cationic electrodepositable coating compositions, there have hitherto been used those obtained by mixing an epoxy resin-amine adduct (obtained by a reaction of an epoxy resin with an active-hydrogen-containing amino compound) with a blocked polyisocyanate compound (a curing agent). These compositions give a coating film which has excellent corrosion resistance but insufficient weathering resistance.

In order to improve said insufficient weathering resistance, it was proposed to modify the epoxy resin with a polyester resin, a polyether resin, an acrylic resin or the like. This approach can give a coating film of slightly improved weathering resistance but reduced corrosion resistance (although the epoxy resin has superior corrosion resistance as a feature).

Moreover, when the epoxy resin is modified with an acrylic resin, the two resins have low compatibility with each other, resulting in (1) insufficient reaction between the two resins and (2) a modification product of high viscosity.

The present inventors made an extensive study in order to develop an electrodepositable coating composition capable of forming a coating film of excellent corrosion resistance and weathering resistance. As a result, the present inventors found out that the above object can be achieved by using a particular polyurethane resin to modify an epoxy resin and using, in combination with said polyurethane resin, a nonionic film-forming resin such as acrylic resin, polyester resin or the like. The finding has led to the completion of the present invention.

According to the present invention, there is provided a cationic electrodepositable coating composition comprising:
[I] a polyurethane-modified epoxy resin-amine adduct obtained by a reaction of:
(A) a polyurethane compound having one terminal isocyanate group in the molecule, obtained by a reaction of (a) a polyhydroxy compound having a number-average molecular weight of 50–8,000, (b) a polyisocyanate compound, and (c) a compound having one active hydrogen atom in the molecule,
(B) a bisphenol type epoxy resin having at least two epoxy groups in the molecule, and
(C) an active-hydrogen-containing amine compound, and [II] a nonionic film-forming resin.

The cationic electrodepositable coating composition of the present invention is hereinafter described in detail.

[I] Polyurethane-modified epoxy resin-amine adduct Polyurethane compound (A)

The polyurethane compound (A) is obtained by a reaction of (a) a polyhydroxy compound, (b) polyisocyante compound and (c) a compound having one active hydrogen atom in the molecule, and has one terminal isocyanate group in the molecule. It desirably has a number-average molecular weight of generally 400–10,000, preferably 700–7,000, more preferably 1,000–4,000.

As to the polyhydroxy compound (a), there is no particular restriction and there can be used any compound as long as it has at least two alcoholic hydroxyl groups in the molecule and has a number-average molecular weight of 50–8,000, particularly 50–6,000, more particularly 50–3,000. The polyhydroxy compound (a) includes, for example, a polyhydric alcohol, a polyester polyol or a polyether polyol both ordinarily used in the production of a polyurethane resin, and a mixture thereof.

The polyhydric alcohol can be exemplified by dihydric alcohols such as ethylene glycol, propylene glycol, butanediol, diethylene glycol, 3-methyl-1,5-pentanediol, 1,6-hexanediol, N-methyl-diethanolamine, N-ethyl-diethanolamine and the like; trihydric alcohols such as glycerine, trimethylolpropane, triethanolamine and the like; and tetrahydric alcohols such as pentaerythritol and the like.

The polyester polyol includes, for example, a condensation product between polyhydric alcohol and polybasic carboxylic acid, a condensation product between hydroxycarboxylic acid and polyhydric alcohol, and a compound obtained by ring opening of a cyclic lactone. The polyhydric alcohol can be the same as mentioned above; and the polybasic carboxylic acid to be condensed with the polyhydric alcohol includes, for example, adipic acid, azelaic acid, a dimer acid, glutaric acid and pyromellitic acid. The hydroxycarboxylic acid includes, for example, dimethylolpropionic acid. As the condensation product between hydroxycarboxylic acid and polyhydric alcohol, there can also be used castor oil and reaction products between castor oil and ethylene glycol, propylene glycol or the like.

The polyether polyol is obtained by subjecting to addition polymerization (1) at least one alkylene oxide such as ethylene oxide, propylene oxide, butylene oxide, tetrahydrofuran or the like and (2) a compound having two or more active hydrogen atoms. As the polyether polyol, there can be used any per se known polyether polyol, ordinarily used in the production of a polyurethane resin. The compound (2) having two or more active hydrogen atoms includes, for example, the above-mentioned polyhydric alcohols and polybasic carboxylic acids; amines such as ethylenediamine, hexamethylenediamine and the like; alkanolamines such as ethanolamine, propanolamine and the like; polyhydric alcohols such as bisphenol and the like; and castor oil.

Of these polyhydroxy compounds (a), particularly preferable are ethylene glycol, propylene glycol, 1,6-hexanediol and N-methyl-diethanolamine.

The polyhydroxy compound (a) can be used as a single compound or in combination of two or more compounds, as long as the compound(s) used has (have) a number-average molecular weight of 50–8,000.

The polyisocyanate compound (b) used in production of the polyurethane compound (A) is a compound having two or more, preferably two or three isocyanate groups in the molecule. As the compound (b), there can be used those generally used in production of a polyurethane resin. Such a polyisocyanate compound (b) includes polyisocyanate compounds of aliphatic type, alicyclic type, aromatic-aliphatic type, etc. Typical examples of the polyisocyanate compound (b) are as follows.

Aliphatic polyisocyanate compounds such as hexamethylene diisocyanate (HMDI), biuret-type adduct of HMDI, isocyanurate of HMDI and the like; alicyclic polyisocyanate compounds such as isophorone diisocyanate (IPDI), biuret-type adduct of IPDI, isocyanurate of IPDI, hydrogenated xylylene diisocyanate, hydrogenated 4,4'-diphenylmethane diisocyante and the like; and aromatic-aliphatic polyisocyanate compounds such as tolylene diisocyanate, xylylene diisocyanate and the like. Of these, particularly preferable are HMDI, IPDI and hydrogenated 4,4'-diphenylmethane diisocyanate.

The polyisocyanate compound (b) can be used as a single compound or in combination of two or more compounds.

The compound (c) having one active hydrogen atom in the molecule, used in production of the polyurethane compound (A) is used for blocking of the isocyanate groups present in the polyisocyanate compound (b). As the compound (c), there can be used such a compound that separates from the blocked isocyanate at the baking temperature (generally 120°–200° C., preferably 160°–180° C.) of a coating film formed with the cationic electrodepositable coating composition of the present invention, to generate free isocyanate groups.

The active-hydrogen-containing compound (c) includes, for example, a monohydric alcohol such as methanol, ethanol, diethylene glycol monobutyl ether or the like; a monocarboxylic acid such as acetic acid, propionic acid or the like; a monohydric thiol such as ethyl mercaptan or the like; a secondary amine such as dialkylamine (e.g. diethylamine) or the like; a compound obtained by reacting the primary amino group of an amine compound having one secondary amino or hydroxyl group and one or more primary amino group (said amine compound can be exemplified by polyalkylenepolyamines such as diethylenetriamine and the like and monoalkanolamines such as monoethanolamine and the like), with a ketone (e.g. acetone or methyl ethyl ketone), an aldehyde (e.g. formaldehyde, acetaldehyde or propionaldehyde) or a carboxylic acid (e.g. formic acid, acetic acid or propionic acid) at a temperature of, for example, 100°–230° C. to convert into an aldimine, a ketimine, oxazoline or imidazoline; and an oxime such as methyl ethyl ketoxime or the like. Of these compounds, diethylene glycol monobutyl ether, ethanol and monoethanolamine are particularly preferable. These active-hydrogen-containing compounds (c) desirably have a molecular weight of generally 30–2,000, particularly 30–1,000, more particularly 30–200.

The polyhydroxy compound (a), the polyisocyanate cyanate compound (b) and the active-hydrogen-containing compound (c) are reacted with each other, whereby a polyurethane compound (A) can be obtained. The appropriate proportions of the components (a), (b) and (c) are generally as follows based on the total amount of (a), (b) and (c).

Polyhydroxy compound (a): 10–94% by weight, preferably 30–80% by weight, more preferably 30–60% by weight Polyisocyanate compound (b): 5–80% by weight, preferably 10–60% by weight, more preferably 10–50% by weight Active-hydrogen-containing compound (c): 1–85% by weight, preferably 1–60% by weight, more preferably 1–50% by weight There is no particular restriction as to the method of the reaction between the polyhydroxy compound (a), the polyisocyanate compound (b) and the active-hydrogen-containing compound (c). The reaction can be conducted, for example, by (1) a method which comprises mixing and reacting the three components (a), (b) and (c) simultaneously, or (2) a method which comprises first reacting the components (b) and (c) and then reacting the reaction product with the component (a). In any reaction method, the proportions of the individual components (a), (b) and (c) and the reaction orders of the components are controlled so that the resulting polyurethane (A) can have one terminal isocyanate group in the molecule.

The method (2) is preferable. Specifically, the method (2) is conducted by reacting the polyisocyanate compound (b) with the active-hydrogen-containing compound (c) in such proportions that the amount of the active-hydrogen-containing group of the compound (c) becomes at least 0.01 equivalent but 1 equivalent or less, preferably 0.5 equivalent or less, more preferably 0.17 equivalent or less per one isocyanate group of the compound (b), until the unreacted active-hydrogen-containing group is not present, to produce a blocked polyisocyanate compound and then adding the polyhydroxy compound (a) so that the isocyanate equivalents of the compound (b) becomes exactly one equivalent larger than the total of the hydroxyl group equivalents and the active hydrogen equivalents of the compound (a) and the compound (c), to conduct a reaction until substantially no hydroxyl group is detected, whereby a polyurethane compound (A) can be produced.

In the above reaction, it is possible to use, as necessary, a known catalyst used for urethane synthesis such as tertiary amine (e.g. triethylamine), organometallic compound (e.g. dibutyltin dilaurate) or the like.

The thus-obtained polyurethane compound (A) has one terminal isocyanate in the molecule, and desirably has a number-average molecular weight of 400–10,000, preferably 700–7,000, more preferably 1,000–4,000. When the number-average molecular weight is less than 400, the resulting cationic electrodepositable coating composition gives a coating film of low flexibility and, when the molecular weight is more than 10,000, the coating film has inferior smoothness. Therefore, such molecular weights are generally not desirable.

Bisphenol type epoxy resin (B)

The bisphenol type epoxy resin (B) is a bisphenol type compound having at least two epoxy groups in the molecule. Particularly preferable as the epoxy resin (B) is a diglycidyl ether of a bisphenol type compound, obtained by a condensation reaction between bisphenol type compound and epihalohydrin (e.g. epichlorohydrin), because it can easily give a coating film of excellent flexibility and corrosion resistance.

Typical examples of the bisphenol type compound usable in preparation of the epoxy resin (B) are compounds represented by the following general formula

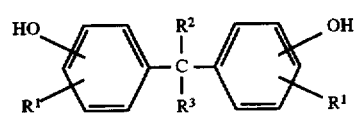

(wherein $R^1$, $R^2$ and $R^3$ are each a hydrogen atom or an alkyl group); and specific examples thereof are bis(4-hydroxyphenyl)-2,2-propane, bis(4-hydroxyphenyl)-1,1-ethane, bis(4-hydroxyphenyl)methane, 4,4'-dihydroxydiphenyl ether, 4,4'-dihydroxydiphenylsulfone, bis(4-hydroxphenyl)-1,1-isobutane and bis(4-hydroxy-3-tert-butylphenyl)-2,2-propane.

The bisphenol type epoxy resin (B) is particularly preferably a diglycidyl ether of bisphenol A, represented by the following formula

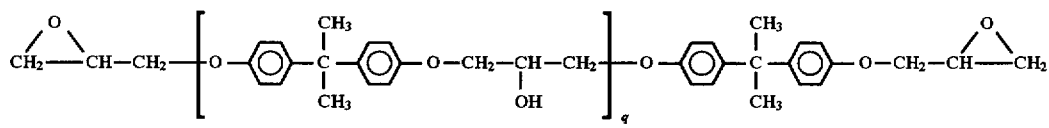

(wherein q is an integer of 2–20), because it can give a coating film of excellent flexibility and corrosion resistance.

As the epoxy resin (B) usable preferably, there can also be used a compound obtained by subjecting a bisphenol type compound and an epihalohydrin to a condensation reaction to obtain a diglycidyl ether of bisphenol and then subjecting an excess amount of said ether and said bisphenol type compound to an etherification reaction.

The epoxy resin (B) used in the present invention, preferably has a number-average molecular weight of generally about 310–10,000, particularly about 320–5,000, more particularly about 320–2,000 and an epoxy equivalents of about 155–5,000, particularly about 150–2,500, more particularly about 160–1,000.

Active-hydrogen-containing amino compound (C)

The active-hydrogen-containing amino compound (C) is an amino compound having an active hydrogen atom(s) reactive with an epoxy group(s), and includes a primary or secondary amine of aliphatic type, alicyclic type or aromatic-aliphatic type, an alkanolamine, modification products thereof, a tertiary amine salt, etc. Examples of these active-hydrogen-containing amine compounds are as follows.

(1) Compounds obtained by reacting the primary amino group of an amine compound containing one secondary amino group and one or more primary amino group (examples of said amine compound are a polyalkylenepolyamine (e.g. diethyltriamine), a hydroxyalkylaminoalkylamine (e.g. hydroxyethylaminoethylamine) and an alkylaminoalkylamine (e.g. ethylaminoethylamine or methylaminopropylamine), with a ketone (e.g. acetone or methyl ethyl ketone), an aldehyde (e.g. acetaldehyde or propionaldehyde) or a carboxylic acid (e.g. acetic acid or propionic acid) at a temperature of, for example, 100°–230° C. to convert into an aldimine, a ketimine, oxazoline or imidazoline.

(2) Secondary monoamines such as dialkylamine (e.g. diethylamine), dialkanolamine (e.g. diethanolamine or di-n- or iso-propanolamine), N-alkylalkanolamine (e.g. N-methylethanolamine or N-ethylethanolamine) and the like.

(3) Secondary-amino-group-containing compounds obtained as an adduct by subjecting a monoalkanolamine (e.g. monoethanolamine) and a dialkyl(meth)acrylamide [e.g. dimethyl(meth)acrylamide] to a Micheal addition reaction.

(4) Compounds obtained by converting the primary amino group of an alkanolamine [e.g. monoethanolamine, neopentanolamine, 2-aminopropanol, 3-aminopropanol or 2-hydroxy-2'-(aminopropoxy)ethyl ether] into a ketimine.

(5) Salts between (a) tertiary amine such as dialkylalkanolamine (e.g. dimethlethanolamine), trialkylamine (e.g. triethyamine, trimethylamine or triisopropylamine), alkyldialkanolamine (e.g. methyldiethanolamine) or the like and (b) organic acid such as acetic acid, lactic acid or the like.

Of these compounds, those belonging to the groups (1), (2) and (4) are preferable. Particularly preferable are diethanolamine and a ketimine of diethylenetriamine because their secondary amino groups can have an active hydrogen group even after the reaction with epoxy group or by the hydrolysis of ketimine and thus can have a crosslinkable functional group.

Polyurethane-modified epoxy resin-amine adduct

The polyurethane-modified epoxy resin-amine adduct contained as an essential component in the cationic electrodepositable coating composition of the present invention can be produced, for example, by reacting the polyurethane compound (A) with the bisphenol type epoxy resin (B) to obtain a polyurethane-modified epoxy resin and then adding the active-hydrogen-containing amine compound (C) to the polyurethane-modified epoxy resin.

In specifically producing the polyurethane-modified epoxy resin-amine adduct, it is particularly preferable in view of the designing and controlling of said adduct obtained, for example, to react the secondary hydroxyl group of the bisphenol type epoxy resin (B) with the polyurethane compound (A) to obtain a polyurethane-modified epoxy resin and then adding the active-hydrogen-containing compound (C) to the terminal oxirane group of the polyurethane-modified epoxy resin. Incidentally, the addition of the active-hydrogen-containing compound (C) may be conducted simultaneously with the production of the polyurethane-modified epoxy resin. The reaction between the active-hydrogen-containing amino compound (C) and the epoxy group of the epoxy resin (B) can be conducted, for example, at a temperature of about 30°–160° C. for about 1–5 hours.

The proportions of the polyurethane compound (A), the epoxy resin (B) and the active-hydrogen-containing amino compound (C) used in the reaction can be varied over a wide range depending upon the application of the resulting resin. Preferably, the amount of the polyurethane compound (A) used is generally 16–80% by weight, particularly 30–70% by weight, more particularly 50–70% by weight based on the total amount of the three components (A), (B) and (C); the amount of the epoxy resin (B) used is generally 20–84% by weight, particularly 25–70% by weight, more particularly 30–50% by weight on the same basis; and the active-hydrogen-containing amino compound (C) is used in such an amount that the resulting polyurethane-modified epoxy resin-amine adduct has an amine value of 15–100, particularly 15–70, more particularly 14–47.

Preferably, the polyurethane-modified epoxy resin-amine adduct formed has a number-average molecular weight of generally 1,000–20,000, particularly 1,000–10,000, more particularly 2,400–4,000.

Also preferably, the polyurethane-modified epoxy resin-amine adduct has a primary hydroxyl group(s). There is no particular restriction as to the equivalents of the primary hydroxyl group(s), but the preferable equivalents are generally 600–1,000, particularly 600–850, more particularly 600–800. In said adduct, the primary hydroxyl group(s) brought about by the active-hydrogen-containing amino compound (C), etc. and the secondary hydroxyl group(s) present in the epoxy resin (B) serve as functional groups reactive with a crosslinking agent.

It is possible to react the polyurethane-modified epoxy resin-amine adduct with a reagent such as tertiary amine salt, monocarboxylic acid, secondary sulfide salt, monophenol, monoalcohol or the like, to allow said adduct to have controlled water dispersibility or give a coating film having improved smoothness.

It is also possible to introduce, into the polyurethane-modified epoxy resin-amine adduct, a crosslinkable functional group such as blocked isocyanate group, β-hydroxycarbamic acid ester group, α,β-unsaturated carbonyl group, N-methylol group or the like, to allow said adduct to have higher internal crosslinkability.

The reaction with a reagent and the introduction of a crosslinkable functional group, both mentioned above may be conducted prior to the addition of the active-hydrogen-containing amino compound (C) to the polyurethane-modified epoxy resin.

[II] Nonionic film-forming resin

The non-ionic film-forming resin {the resin [II]} used in combination with the above-mentioned polyurethane-modified epoxy resin-amine adduct {the resin [I]} contains substantially no functional group (e.g. carboxyl group or amino group) capable of forming an ionic group (a cationic or anionic group) when neutralized with an acid or a base, and is per se a thermoplastic resin capable of forming a continuous film under the baking conditions for electrodeposited coating film. The resin [II] may contain, as necessary, a functional group (e.g. a hydroxyl or epoxy group) reactive with an external crosslinking agent (which is described later).

The resin [II] has a number-average molecular weight of generally about 3,000–100,000, preferably about 3,500–70,000, more preferably about 4,000–50,000, and desirably has, in the molecule, a nonionic functional group (e.g. a hydroxyl group) crosslinkable with the blocked isocyanate group of the resin [II] or with an external curing agent during baking and curing.

Preferable examples of the resin [I] having the above-mentioned properties are an acrylic resin, a polyester resin, a polyester-modified acrylic resin, an acrylic resin-modified polyester resin and a silicone-modified resin.

Preferable examples of the resin [II] are specifically described below.

The monionic acrylic resin includes acrylic resins obtained by using, as a main monomer, at least one acrylic monomer selected from alkyl (meth)acrylates [e.g. methyl (meth)acrylate, ethyl (meth)acrylate, butyl (meth)acrylate, propyl (meth)acrylate and 2-ethylhexyl (meth)acrylate], hydroxyalkyl (meth)acrylates [e.g. hydroxyethyl (meth) acrylate and hydroxypropyl (meth)acrylate], glycidyl (meth) acrylate, etc. and, as other unsaturated monomer, at least one compound appropriately selected from vinyl aromatic compounds (e.g. styrene and α-methylstyrene), (meth) acrylonitrile, (meth)acrylamide, olefins (e.g. ethylene and propylene), dienes (e.g. butadiene and isoprene), vinyl acetate, etc. so as to satisfy the properties required for the resin to be obtained, and (co)polymerizing the main monomer and the other unsaturated monomer according to an ordinary process.

The acrylic resin desirably contains the units derived from the at least one acrylic monomer, in an amount of 25% by weight or more, particularly 35% by weight or more, more particularly 50% by weight or more. Also, the acrylic resin has an appropriate number-average molecular weight of about 3,000–100,000, preferably about 3,500–70,000, more preferably about 4,000–50,000. The acrylic resin, when containing a hydroxyl group(s) as a functional group, can react with the blocked isocyanate group in the resin [I] or with a blocked polyisocyanate compound (an external crosslinking agent) and can be crosslinked and cured.

The nonionic polyester resin used as the resin [II] includes, for example, a polyester resin having no terminal carboxyl group, which can be produced by subjecting, to polycondensation by an ordinary process, (1) a polybasic acid component such as phthalic acid or its anhydride, isophthalic acid, terephthalic acid, trimellitic acid or its anhydride, pyromellitic acid or its anhydride, hexahydrophthalic acid or its anhydride, succinic acid, adipic acid, pimelic acid, sebacic acid, brassylic acid or the like and (2) a polyol component such as ethylene glycol, diethylene glycol, propylene glycol, neopentyl glycol, 1,6-hexanediol, trimethylolpropane, glycerine, pentaerythritol, tricyclodecanedimethanol or the like. In the production, it is possible to use, for example, benzoic acid or p-tert-butylbenzoic acid as a terminal-blocking agent to control the molecular weight of the resulting polyester resin.

The polyester resin can have a number-average molecular weight of generally 3,000–100,000, preferably 3,500–70,000, more preferably 4,000–50,000.

The resin [II] may be a blend of the acrylic resin and the polyester resin. Or, the resin [II] may be a polyester-modified nonionic acrylic resin obtained by modifying (grafting) the acrylic resin with a polyester, or an acrylic resin-modified nonionic polyester resin obtained by modifying (grafting) the polyester resin with an acrylic resin.

The nonionic silicone-modified resin usable as the resin [II] includes a resin obtained by modifying an appropriate base resin (e.g. the above-mentioned acrylic resin or polyester resin, or an alkyd resin) with a silicone resin. The appropriate amount of the silicone resin used is generally 50% by weight or less, preferably 3–45% by weight, more preferably 3–30% by weight based on the total resin {the resin [II]}.

The silicone resin used for modification of the base resin is generally an organopolysiloxane resin having a number-average molecular weight of about 500–2,000 and having, in the molecule, at least two reactive groups (e.g. hydroxyl groups or alkoxyl groups). The commercial products of such a silicone resin are, for example, Z-6018 (molecular weight= 1,600), Z-6188 (molecular weight=650), Sylkyd 50 and DC-3037 (these are products of Dow Corning Co.); KR-216, KR-218 and KSP-1 (these are products of Shin-Etsu Chemical Co., Ltd.); TSK-160 ad TSR-165 (these are products of Toshiba Corporation); and SH 5050, SH 6018 and SH 6188 (these are products of Dow Corning Toray Silicone Co., Ltd.).

The silicone-modified resin can be produced by subjecting the silicone resin and the base resin e.g. an acrylic resin or a polyester resin) having a hydroxyl group(s) and/or a carboxyl group(s) to cocondensation in the proportions mentioned above, by a per se known process.

Of the above-mentioned various resins [II], the polyester-modified nonionic acrylic resin in which the amount of polyester grafted is 5–80% by weight, preferably 5–40% by weight based on the total resin, is particularly preferable because the resin has good compatibility with the polyurethane-modified epoxy resin-amine adduct and it is easy to introduce a crosslinkable functional group into the resin.

Cationic electrodepositable coating composition

The cationic electrodepositable coating composition of the present invention can be prepared by dissolving or dispersing the resin [I] and the resin [II] in an aqueous medium by a per se known method.

The composition can be prepared, for example, by (1) a method of dissolving the resin [I] and the resin [II] in an organic solvent miscible with water, mixing the solution with water and an acid (a water-soluble organic or inorganic acid such as acetic acid, formic acid, lactic acid, phosphoric acid, sulfuric acid or the like) to conduct neutralization and form an aqueous bath, or (2) a method of dispersing the resin [I] in an aqueous medium, neutralizing the dispersion with an acid such as mentioned above to form an aqueous bath, and dispersing, in the aqueous bath, a solution of the resin [II] in an organic solvent miscible with water, forcibly by the use of a homogenizer. In the composition obtained by any of the above methods (1) and (2), the particles of the resin [II] are dispersed in water very stably by the acid neutralization product of the resin [I], whereby the composition can have excellent storage stability over a long period of time. The amount of the acid used for formation of aqueous bath cannot be specified strictly, but a preferable amount is generally about 5–40 KOH mg, particularly 10–20 KOH mg per g of resin solid in view of the electrodepositability of the resulting composition.

In the preparation of the present electrodepositable coating composition, the resin [I] and the resin [II] can each be used singly or in combination of two or more resins. The proportions of the resin [I] and the resin [II] compounded can be varied depending upon, for example, the kinds of respective resins and the properties required for the resulting electrodepositable coating composition, but the weight ratio of the resin [I]/the resin [II] can be generally 15/85 to 95/5, preferably 30/70 to 90/10, more preferably 50/50 to 80/20. When the weight ratio is outside the above range, it is difficult to obtain a coating film having an effective concentration gradient and the film tends to show inferior weathering resistance and corrosion resistance.

The electrodepositable coating composition of the present invention can comprise as necessary, besides the resin [I] and the resin [II], various additives ordinarily used in coating industry, such as coloring pigment, corrosion-resistant pigment, extender pigment, inhibitor (corrosion suppressant), curing catalyst, surfactant and other additives. The present composition furthermore comprise, as an external crosslinking agent, a compound having two or more crosslinkable functional groups in the molecule, such as blocked polyisocyanate, β-hydroxycarbamic acid ester of polyamine, malonic acid ester, malonic acid ester derivative, methylolmelamine, methylolurea or the like. The desirable amount of the external crosslinking agent added is generally 100/0 to 60/40, preferably 90/10 to 65/35, more preferably 85/15 to 75/25 in terms of the weight ratio of {the resin [I]+the resin [II]}/the external crosslinking agent.

The method and apparatus used for applying the present electrodepositable coating composition to a material to be coated, can be a method and an apparatus both used conventionally in cationic electrodeposition. In this case, it is preferable that the material to be coated is used as a cathode and stainless steel or a carbon plate is used as an anode. There is no particular restriction as to the electrodeposition conditions used, but it is generally desirable to conduct electrodeposition with stirring under the following conditions.

Bath temperature: 20°–30° C.

Voltage: 100–400 V (preferably 200–300 V)

Current density: 0.01–3 A/dm$^2$

Electrodeposition time: 1–5 minutes

Anode-to-cathode areal ratio: 2/1 to 1/2

Distance between electrodes: 10–100 cm

The coating film formed on the material to be coated (the cathode) is washed and then baked and cured at about 140°–180° C.

The polyurethane-modified epoxy resin-amine adduct used in the present cationic electrodepositable coating composition, which is modified with a particular polyurethane, allows for good compatibility between polyurethane-modified epoxy resin and unmodified epoxy resin in coating film and can form a coating film superior in weathering resistance, corrosion resistance and appearance.

The present invention further provides a coating method using the above-mentioned cationic electrodepositable coating composition, specifically a coating method which is simple to apply, which can give a coating film very superior in appearance, corrosion resistance, weathering resistance, chipping resistance, etc., and which contributes to resource saving and reduced public hazard.

To the outer panels of automobiles, bicycles, electric appliances, etc. wherein decorative appearance is important, final coating has been applied with an organic solvent-diluted thermosetting coating capable of forming a coating film superior in smoothness, distinctness of image gloss, weathering resistance, etc. The whole coating operation comprises, in many cases, (1) applying a cationic electrodepositable coating for imparting corrosion resistance, (2) applying an intermediate coating for securing weathering resistance, (3) heat-curing the resulting two coating films, (4) applying, as a top coat, an organic solvent type thermosetting, enamel coating containing a coloring pigment and/or a metallic pigment (this coating is hereinafter referred to as "base coat"), followed by air drying, (5) applying an organic solvent type thermosetting transparent clear coating, and (6) heat-curing the resulting two coating films simultaneously in a so-called two-coat one-bake method.

In recent years, the requirements for coating film appearance (e.g. smoothness, distinctness of image gloss and build-up feeling) have become higher; and moreover, resource saving, reduced public hazard and lower cost have come to be desired.

The improved film appearance is achieved by addition of appropriate rheology-controlling agent or by polishing of intermediate coating film formed, for the main purpose of smoothening the top coat film. Meanwhile, there is used, in some cases, a high-solid coating developed for reduced public hazard.

In the above-mentioned approaches, however, the addition of rheology-controlling agent has a limitation in improvement of smoothness and distinctness of image gloss of coating film and provides no thorough solution. The polishing of intermediate coating film invites increase in number of operational steps and promises no sufficient improvement in appearance. Further, conventional solvent type base coats contain a large amount of an organic solvent and are undesirable from the standpoints of resource saving and public hazard. High-solid coatings have a restriction in reduction in organic solvent, and use of such a coating as a base coat is difficult to obtain a final whiteness when the base coat is a light metallic (e.g. silver) type. There is other conventional coating operation which applies a cationic electrodepositable coating, an intermediate coating, an aqueous metallic base coat and a powder clear coating; however, this coating operation requires a high total cost in view of the whole operation.

It has been found out that, by using the cationic electrodepositable coating composition of the present invention containing substantially no pigment (said composition is hereinafter referred to as "clear cationic electrodepositable coating"), in combination with an aqueous base coat and a powder coating (a top coat), there can be provided a coating method which is free from the above-mentioned problems of the prior art, which is simple to apply, which can give a coating film very superior in appearance, corrosion resistance, weathering resistance, chipping resistance, etc., and which contributes to resource saving and reduced public hazard.

According to the first coating method variant of the present invention, there is provided a coating method comprising:

(1) coating, on a material to be coated, the above-mentioned cationic electrodepositable coating composition of the present invention containing substantially no pigment (no coloring pigment or extender pigment), i.e. the clear cationic electrodepositable coating, followed by heat-curing the coated composition, (2) coating, on the cured composition, an aqueous coating containing a metallic pigment and/or a coloring pigment, as a first top coat, followed by heat-curing the coated aqueous coating, and (3) coating, on the cured first top coat, a powder coating containing substantially no pigment, as a second top coat, followed by heat-curing the coated powder coating.

According to the second coating method variant of the present invention, there is provided a coating method comprising:

(1) coating, on a material to be coated, the above-mentioned cationic electrodepositable coating composition of the present invention containing substantially no pigment (no coloring pigment or extender pigment), i.e. the clear cationic electrodepositable coating, followed by heat-curing the coated composition, (2) coating, on the cured composition, an aqueous coating containing a metallic pigment and/or a coloring pigment, as a first top coat, (3) coating, on the cured first top coat, a powder coating containing substantially no pigment, as a second top coat, and (4) simultaneously heat-curing the two coating films formed in the above (2) and (3).

The coating method of the present invention has a feature in that the aqueous coating of the above step (2) as a first top coat and the powder coating of the above step (3) as a second top coat are coated, in a two-coat two-bake mode (in the first coating method variant) or in a two-coat one-bake mode (in the second coating method variant), on the coating film of good weathering resistance made in the step (1) from the clear cationic electrodepositable coating of particular composition, without coating an intermediate coating ordinarily used between the step (1) and the steps (2) and (3).

The clear cationic electrodepositable coating used in the step (1) of the present coating method comprises [I] a polyurethane-modified epoxy resin-amine adduct obtained by modifying an epoxy resin having good corrosion resistance, with a urethane compound having good weathering resistance and chipping resistance and [II] a nonionic film-forming resin having good weathering resistance, and contains substantially no coloring pigment or extender pigment. Consequently, the coating film formed with the cationic electrodeposition bath of the above coating has excellent corrosion resistance, weathering resistance and chipping resistance.

In the present coating method, on the cured coating film of the clear cationic electrodepositable coating are directly coated the first and second top coats in this order, without coating no intermediate coating. Nevertheless, there occurs no photodeterioration-induced interlaminar separation in which, during outdoor exposure, the primer causes photodeterioration owing to a light passing through the top coat and interlaminar separation takes place between the primer and the top coat. Moreover, in the coating method of the present invention, no intermediate coating is applied, making the coating operation simple and the coating cost lower.

The aqueous coating used in the step (2) is a metallic or solid color coating using water as a solvent or a dispersing agent and contains no or substantially no organic solvent. This is very effective in resource saving and reduced public hazard. Moreover, the aqueous coating used generally in a low solid content. This results in a large volume contraction from coating to curing, easy and parallel orientation of scaly metallic pigment to adherend, and easy formation of brilliant metallic feeling. Even in solid color finishing, unevenness generated during coating is easily smoothened, and excellent smoothness and distinctness of image gloss are obtained.

The powder coating used in the step (3), applied on the coated aqueous coating contains no organic solvent. Therefore, it is particularly effective in resource saving and reduced public hazard, similarly to the aqueous coating. Moreover, since it can be coated in a film thickness of 60μ or more, it can form a coating film having excellent appearance in build-up feeling, smoothness, distinctness of image gloss, etc.

The coating method of the present invention is described in more detail below.

Step (1)

In this step, the clear cationic electrodepositable coating is electrodeposited on a material to be coated, and then heat-cured.

The method and apparatus used for electrodepositing the present clear cationic electrodepositable coating on a material to be coated, can be a method and an apparatus both used conventionally in cationic electrodeposition. In this case, it is desirable that the material to be coated is used as a cathode and stainless steel or a carbon plate used as an anode. There is no particular restriction as to the electrodeposition conditions used, but it is generally desirable to conduct electrodeposition with stirring under the following conditions.

Bath temperature: 20°–30° C.

Voltage: 100–400 V (preferably 200–300 V)

Current density: 0.01–3 A/dm$^2$ (preferably, 0.05–2 A/dm$^2$)

Electrodeposition time: 1–5 minutes

Anode-to-cathode areal ratio: 2/1 to 1/2

Distance between electrodes: 10–100 cm

The coating film formed on the material to be coated (the cathode) is washed and then baked and cured generally at about 140°–180° C. for about 5–60 minutes.

The film of the clear cationic electrodepositable coating can have a thickness of generally 5–40 μm, preferably 10–30 μm after cure.

Step (2)

In this step, the aqueous coating containing a metallic pigment and/or a coloring pigment is applied as a first top coat on the cured film of the clear cationic electrodepositable coating formed in the step (1).

The aqueous coating is a thermosetting coating comprising a basic resin, a curing agent, a metallic pigment and/or a coloring pigment, water (these are main components) and, as necessary, an organic solvent, etc.

The basic resin is a main component of the coating film formed by a first top coat and is preferably a resin used for coatings, which has good weathering resistance and which can be made water-soluble or water-dispersible. It includes, for example, a resin which uses, as a base, an acrylic resin, a polyester resin, an epoxy resin, a urethane resin or the like (these are ordinarily used as a vehicle for aqueous coating) and which can be made water-soluble or water-dispersible. Said resin, which can be made water-soluble or water-dispersible, basically contains a hydrophilic group [e.g. carboxyl group (—COOH), hydroxyl group (—OH), methylol group (—CH$_2$OH), amino group (—NH$_2$), sulfone group (—SO$_3$H), or polyoxyethylene bond (CH$_2$CH$_2$O)$_n$] in an amount sufficient for the resin to become water-soluble or water-dispersible. Said resin is most typically a carboxyl group-containing resin which can be made water-soluble or water-dispersible by neutralization and subsequent formation of an alkali salt. The amount of the carboxyl group required for dissolution in water or dispersion in water varies depending upon the skeleton of resin, the content of other hydrophilic group, the kind of neutralizing agent and the neutralization equivalents, but the acid value is required to be 30 or more generally. The carboxyl group-containing resin can be made water-soluble or water-dispersible generally by neutralizing with an alkaline substance such as sodium hydroxide, an amine or the like.

The acrylic resin includes, for example, those having an acid value of about 30–100 particularly 35–90 and a hydroxyl value of about 20–200, particularly 30–150, obtained by copolymerizing an α,β-ethylenically unsaturated carboxylic acid, a (meth)acrylic acid ester having functional groups such as hydroxyl group, amido group, methylol group and the like, other (meth)acrylic acid ester, styrene, etc.

The polyester resin includes those obtained by subjecting a polybasic acid, a polyhydric alcohol and a modified glyceride(s) to a condensation reaction by an ordinary method. The epoxy resin includes epoxyester resins obtained, for example, by (1) a method which comprises reacting an epoxy compound with an unsaturated fatty acid to synthesize an unsaturated epoxy ester and adding an α,β-unsaturated acid to the unsaturated group of said ester or (2) a method which comprises esterifying the hydroxyl group of an epoxy ester with a polybasic acid such as phthalic acid or trimellitic acid.

The urethane resin includes polymers obtained by reacting the above-mentioned acrylic resin or polyester resin or epoxy resin with a diisocyanate compound.

The dispersion in water, of the basic resin can also be conducted by emulsion-polymerizing the monomer components used for production of the basic resin, in the presence of a surfactant or a water-soluble resin, or by dispersing the basic resin in water in the presence of, for example, an emulsifier. In this dispersion in water, the basic resin need not contain any of the above-mentioned hydrophilic groups or can contain said hydrophilic group in an amount smaller than that of the water-soluble resin.

As the aqueous dispersion of the acrylic resin, there is preferred an aqueous dispersion of an acrylic (co)polymer having an average particle diameter of about 0.05–1 μm, which dispersion is prepared by polymerizing an acrylic monomer and, as necessary, other copolymerizable monomer in the presence of a known dispersion stabilizer such as nonionic surfactant (e.g. polyoxyethylene nonyl phenyl ether), anionic surfactant (e.g. salt of polyoxyethylene alkyl aryl ether sulfate) or water-soluble resin (e.g. acrylic resin having an acid value of about 20–150, particularly 30–100 and a number-average molecular weight of about 5,000–30,000, particularly 5,000–20,000).

Examples of the monomers used in the above polymerization are α,β-ethylenically unsaturated carboxylic acids such as (meth)acrylic acid, maleic acid, fumaric acid, itaconic acid, half-esterified products of maleic acid or fumaric acid and the like; (meth)acrylic acid esters such as methyl (meth)acrylate, ethyl (meth)acrylate, propyl (meth)acrylate, butyl (meth)acrylate, 2-ethylhexyl (meth)acrylate and the like; hydroxyl group-containing (meth)acrylic acid esters such as hydroxyethyl (meth)acrylate, hydroxypropyl (meth) acrylate and the like; and other polymerizable unsaturated monomers such as N-propoxymethyl(meth)acrylamide, N-butoxymethyl(meth)acrylamide, glycidyl (meth)acrylate, styrene, vinyl acetate and the like.

The above polymerizable unsaturated monomers may be used, as necessary, together with a small amount of a polyfunctional unsaturated monomer such as ethylene glycol di(meth)acrylate, 1,6-hexanediol di(meth)acrylate, trimethylolpropane di(meth)acrylate, trimethylolpropane tri (meth)acrylate or the like.

The above aqueous dispersion is preferably one obtained by multistage polymerization. That is, first, a monomer containing no α,β-ethylenically unsaturated acid or a monomer mixture containing a small amount (preferably 5% by weight or less of the total monomers) of said acid is polymerized (copolymerized); then, a monomer mixture containing a large amount (preferably 5–30% by weight of the total monomers) of said acid is copolymerized; thus, a multistage polymerization emulsion is obtained. This multistage polymerization emulsion is preferable in view of the coating operation because the emulsion is thickened by neutralization with a neutralizing agent. The neutralizing agent usable includes ammonia, or a water-soluble amino compound such as monoethanolamine, diethanolamine, ethylamine, dimethylamine, diethylamine, triethylamine, propylamine, dipropylamine, isopropylamine, diisopropylamine, triethanolamine, butylamine, 2-ethylhexylamine, ethylenediamine, propylenediamine, methylethanolamine, dimethylethanolamine, diethylethanolamine, morpholine or the like. Of these, triethylamine and dimethylethanolamine (both are tertiary amines) are particularly preferable. Also, an acrylic resin of high acid value or a resin thickened with a thickener is also useful for the object of the present invention.

It is advantageous that the acrylic resin present in the aqueous dispersion is subjected to internal crosslinking in view of the mechanical stability and storage stability of said dispersion. Further, this aqueous dispersion of the acrylic resin may also contain, as necessary, water-dispersible resins of polyester type and polyurethane type produced by known processes.

The curing agent used in the aqueous coating acts to thermally and three-dimensionally crosslink and cure the basic resin also used in said coating. Preferable examples of the curing agent are amino resins obtained by (co) condensing melamine, benzoguanamine, urea or the like with formaldehyde, or further etherifying the reaction product with a lower monohydric alcohol.

The metallic pigment usable in the aqueous coating includes, for example, metal flakes such as aluminum flake, copper flake, bronze flake and the like. The coloring pigment includes, for example, inorganic pigments such as titanium dioxide, iron oxide, chromium oxide, lead chromate, carbon black and the like; and organic pigments such as Phthalocyanine Blue, Phthalocyanine Green, Carbazole Violet, Anthrapyrimidine Yellow, Flavanthrone Yellow, Isoindoline Yellow, Indanthrene Blue, Quinacridone Violet and the like. The metallic pigment and the coloring pigment can be used each singly or in combination of the two pigments. It is possible to further add an extender pigment such as talc, kaolin or the like.

The proportions of the individual components in the aqueous coating used in the step (2) can be appropriately selected depending upon the purpose of said coating. For example, however, the basic resin and the curing agent are preferably used so that the former is 60-90% by weight, particularly 70-85% by weight and the latter is 40-10% by weight, particularly 30-15% by weight based on the total weight of said two components; and the pigments can be used so as to give desired metallic feeling, a desired color, etc. and are appropriately added in the range of generally about 1-250 parts by weight, particularly about 5-200 parts by weight per 100 parts by weight of the total resin (solid) content of the basic resin and the curing agent.

The aqueous coating can be obtained by mixing the basic resin, the curing agent and the pigments with deionized water and, as necessary, additives such as organic solvent, thickening agent, defoaming agent and the like by an ordinary method and controlling the solid content to about 10-40% by weight and the viscosity to about 800-5,000 cps/6 rpm (Brookfield viscometer).

The aqueous coating can be used very suitably as a first base coat in the two-coat two-bake or two-coat one-bake application. The aqueous coating can be applied on the cured film of the clear cationic electrodepositable coating formed in the step (1), by spray coating or the like so as to give a cured film thickness of, for example, about 10-50 μm, particularly 15-40 μm. The curing of the aqueous coating film formed can be conducted, in the case of two-coat two-bake application, by heating the film to its curing temperature, for example, about 120°-170° C. generally for about 5-60 minutes.

Step (3)

In this step, a powder coating (a second top coat) containing substantially no pigment is coated on the cured film (in the first coating method variant of the present invention) or the uncured film (in the second coating method variant of the present invention) both formed with the aqueous coating (a first top coat) in the step (2).

The powder coating can be a per se known thermosetting powder coating which can be coated on the cured or uncured film formed with the aqueous coating in the step (2). The powder coating is basically a powder coating containing a basic resin and a curing agent as main components but containing substantially no coloring pigment or metallic pigment and which can form a transparent coating film through which the metallic or colored coating film formed in the step (2) can be seen.

The basic resin is a main component necessary for formation of film of coating powder, and includes, for example, an acrylic resin, a polyester resin, a fluororesin, a urethane resin and modified resins thereof (e.g. graft polymers) all having at least one crosslinkable functional group selected from hydroxyl group, carboxyl group, glycidyl group, etc. These resins are merely illustrative and the basic resin is not restricted thereto. The basic resin preferably has a glass transition temperature (Tg) of generally 50° C. or more, particularly 60°-120° C. The composition, molecular weight, etc. of the basic resin have no particular restriction and can be determined appropriately depending upon the purpose of the coating powder.

The curing agent is to thermally and three-dimensionally crosslink and cure the basic resin. Examples thereof can be an alkoxymethylolmelamine, a blocked polyisocyanate compound, an epoxy compound, an isocyanurate compound and an aliphatic dibasic acid.

The proportions of the basic resin and the curing agent are most preferably such that the functional group(s) in the basic resin and the functional group(s) in the curing agent become about equimolar.

The powder coating used in the step (3) may further comprise, as necessary, additives for coating, such as flow controlling agent, ultraviolet light absorber, photostabilizer and the like.

The powder coating can be obtained generally by melt-kneading the above-mentioned individual components and cooling the kneaded product, followed by grinding into appropriate particle sizes (e.g. an average particle size of 10-200 μm).

The powder coating is applied on the cured film formed with the aqueous coating in the step (2). Alternatively, the aqueous coating is applied in the step (2) and air-dried at normal temperature or at a temperature of 100° C. or less to remove nearly all the water contained in the applied coating; and on the resulting uncured film of the aqueous coating is applied the powder coating. There is no particular restriction as to the application method of the powder coating, and there can be used a per se known method for powder coating application, such as electrostatic spray coating, fluidized bed coating or the like.

There is no particular restriction as to the film thickness of the powder coating, but the cured film thickness is appropriately 40-200 μm generally and, in order to allow the cured film to be superior in smoothness, distinctness of image gloss, luster, build-up feeling, etc. is preferably 60-120 μm.

The curing temperature of the film of the powder coating can be the curing temperature of the powder coating, for example, about 120°-170° C. The heating time for curing is about 5-60 minutes.

Step (4)

The curing temperature used for simultaneously curing, in the two-coat one-bake system, the first top coat film and the second top coat film formed with the aqueous coating and the powder coating in the step (2) and the step (3) according to the second coating method variant of the present invention, can be generally about 120°-170° C. at which the two coating films can be cured. The heating time for the simultaneous curing can be generally about 5-60 minutes. Thus, the two coating films can be cured simultaneously.

The above-mentioned coating method of the present invention is simple to apply, can give a coating film very superior in appearance, corrosion resistance, weathering resistance, chipping resistance, etc., and contributes to resource saving and reduced public hazard. Said method can be widely utilized in coating of automobiles, bicycles, electric appliances, etc.

The present invention is hereinafter described more specifically by way of Examples. In the following, % refers to % by weight.

[Preparation of Samples]

Production of polyurethane-modified epoxy resin-amine adduct (I-1)

Into a flask equipped with a stirrer, a thermometer, a nitrogen inlet tube and a reflux condenser were fed 666 g of isophorone diisocyanate (a product of Daicel-Hüls Ltd.), 269 g of methyl isobutyl ketone, 118 g of ethylene glycol monobutyl ether and 0.2 g of dibutyltin dilaurate. They were reacted in a nitrogen atmosphere at 70° C. until the isocyanate group concentration became 6.38 mM/g. Thereto was added 1,634 g of Placcel 208 (a polyester polyol obtained by ring opening of cyclic lactone, having OH equivalents of 409, a product of DAICEL CHEMICAL INDUSTRIES, LTD.), after which a reaction was conducted in a nitrogen atmosphere at 70° C. until the isocyanate group concentration became 0.414 mM/g to obtain a viscous urethane prepolymer solution.

Separately, into a flask equipped with a stirrer, a thermometer, a nitrogen inlet tube and a reflux condenser were fed 775 g of bisphenol A diglycidyl ether having epoxy equivalents of 190, 237 g of bisphenol A and 13.5 g of methylbenzylamine. They were reacted at 110° C. until the epoxy concentration became 1.85 mM/g, to obtain an epoxy resin having a number-average molecular weight of 1,025 and epoxy equivalents of 539.

To this epoxy resin was added 1,333 g of the urethane prepolymer solution obtained above. They were reacted in a nitrogen atmosphere at 90° C. until no isocyanate group remained. The reaction mixture was diluted with 378 g of ethylene glycol monobutyl ether, followed by addition of 200 g of diethanolamine. The mixture was subjected to a reaction at 90° C. until no epoxy group remained. The reaction mixture was diluted with ethylene glycol monobutyl ether to a solid content of 75% to obtain a polyurethane-modified epoxy resin-amine adduct solution (I-1) having primary hydroxyl group equivalents of 638 and an amine value of 46.3.

| Production of nonionic acrylic resin (II-1) | |
|---|---|
| (1) Butyl cellosolve | 26 parts |
| (2) 80% polyester monomer (FM-3X, a product of DAICEL CHEMICAL INDUSTRIES, LTD.) | 37.5 parts |
| (3) Styrene | 40 parts |
| (4) Hydroxyethyl methacrylate | 25 parts |
| (5) n-Butyl methacrylate | 5 parts |
| (6) AIBN (azobisisobutyronitrile) | 4 parts |
| (7) Butyl cellosolve | 5 parts |

-continued

| Production of nonionic acrylic resin (II-1) | |
|---|---|
| (8) Azobisdimethylvaleronitrile | 0.5 part |
| (9) Cellosolve | 23 parts |

The component (1) was heated to 130° C. Thereto were dropwise added the components (2) to (6) at 130° C. in 5 hours. The mixture was kept at 130° C. for 2 hours. Thereto were dropwise added the components (7) and (8) at 130° C. in 2 hours. The mixture was kept at 130° C. for 2 hours. Then, the component (9) was added, followed by cooling, whereby was obtained an acrylic resin solution (II-1) having a solid content of 62% and a number-average molecular weight of about 5,000.

[Examples 1–3 and Comparative Examples 1–2]

The resin (I-1), the resin (II-1) (both obtained above) and methyl ethyl ketoxime-blocked isophorone diisocyanate (a crosslinking agent) were compounded in the proportions (expressed in terms of resin solid content) shown in Table 1. Thereto were added 1 g of a polypropylene glycol (SANNIX PP4000, a product of Sanyo Chemical Industries, Ltd.), 0.82 g of formic acid and 1 g of lead acetate (all the amounts are per 100 g of the solid content of the above-compounded resin composition). To the mixture was gradually added deionized water with stirring at 40° C., to give rise to dispersion to obtain a stable emulsion having a resin solid content of 30%. To the emulsion were added 3 g of basic lead silicate, 13 g of titanium white, 0.3 g of carbon, 3 g of clay, 2 g of dibutyltin oxide and 1 g of a nonionic surfactant [Noigen EA-142B (trade name), a product of Daiichi Kogyo Seiyaku Co., Ltd.] (all the amounts are per 100 g of the resin solid content of the emulsion). The mixture was subjected to dispersion of components by the use of a ball mill until the particle sizes became 10μ or smaller, followed by dilution with deionized water until the resin solid content became 15%. Thus, various cationic electrodepositable coating compositions were obtained.

Each composition was cationically electrodeposited on an untreated steel plate at a bath temperature of 28° C. at a voltage of 250 V for 3 minutes. Each electrodeposited plate was subjected to curing at 170° C. for 20 minutes to obtain various coated panels. The test results for the coated panels are shown in Table 1.

TABLE 1

| | Examples | | | Comparative Examples | |
|---|---|---|---|---|---|
| | 1 | 2 | 3 | 1 | 2 |
| Compounding (solid content) | | | | | |
| Resin (I-1) | 67 | 52 | 38 | 7 | 75 |
| Resin (II-1) | 8 | 23 | 37 | 68 | 0 |
| Crosslinking agent | 25 | 25 | 25 | 25 | 25 |
| Film properties | | | | | |
| Surface condition (*1) | ○ | ○ | ○ | X | ○ |
| Weathering resistance (*2) | 700H< | 800H< | 800H< | 800H< | 600H< |
| Corrosion resistance (*3) | 1.0 mm | 1.0 mm | 1.5 mm | 10.0 mm | 1.0 mm |

The tests in Table 1 were made as follows.
(*1) Surface condition (visual)
○: good
X: poor
(*2) Weathering resistance On the above-prepared coated panel was coated a top clear (Magicron 7000, a product of Kansai Paint Co., Ltd.) to obtain a test panel for weathering resistance. The test panel was placed in a sunshine weatherometer (test temperature: 63°±3° C., spraying interval: 12 minutes per each 60 minutes; humidity: 50±5%) for 20 hours and then immersed in hot water of 40° C. for 2 hours. This test cycle was repeated. After the completion of each test cycle, the test panel was cross-cut and a cellophane tape was adhered thereon. Then, the tape was peeled to examine the adhesivity between the base coating and the clear coating. The time until the peeling of the clear coating occurred distinctly in the vicinities of the cross-cut portions, was taken as weathering resistance.

(*3) Corrosion resistance (to salt spraying)

A coated panel was cross-cut and tested according to JIS Z 2871 for 480 hours; then, a cellophane tape was adhered thereto and peeled to measure the width of peeling.

The coating method of the present invention is described more specifically with reference to the following Examples.

[Preparation of Samples]

Production of clear cationic electrodepositable coating (I-a)

52 g (as solid content) of the resin (I-1), 23 g (as solid content) of the resin (II-1) (both obtained above) and 25 g (as solid content) of methyl ethyl ketoxime-blocked isophorone diisocyanate (a crosslinking agent) were compounded. Thereto were added 1 g of a polypropylene glycol (SANNIX PP4000, a product of Sanyo Chemical Industries, Ltd.), 0.82 g of formic acid and 1 g of lead acetate (all the amounts are per 100 g of the solid content of the above-compounded resin composition). To the mixture was gradually added deionized water with stirring at 40° C., to give rise to dispersion to obtain a stable emulsion having a resin solid content of 30%. To the emulsion were added 3 g of basic lead silicate, 2 g of dibutyltin oxide and 1 g of a nonionic surfactant [Noigen EA-142B (trade name), a product of Daiichi Kogyo Seiyaku Co., Ltd.] (all the amounts are per 100 g of the resin solid content of the emulsion). The mixture was subjected to dispersion of components by the use of a ball mill until the particle sizes became 10µ or smaller, followed by dilution with deionized water until the resin solid content became 15%. Thus, a clear cationic electrodepositable coating (I-a) was obtained.

Production of cationic electrodepositable coating (I-b) for comparison 52 g (as solid content) of the resin (I-1), 23 g (as solid content) of the resin (II-1) (both obtained above) and 25 g (as solid content) of methyl ethyl ketoxime-blocked isophorone diisocyanate (a crosslinking agent) were compounded. Thereto were added 1 g of a polypropylene glycol (SANNIX PP4000, a product of Sanyo Chemical Industries, Ltd.), 0.82 g of formic acid and 1 g of lead acetate (all the amounts are per 100 g of the solid content of the above-compounded resin composition). To the mixture was gradually added deionized water with stirring at 40° C., to give rise to dispersion to obtain a stable emulsion having a resin solid content of 30%. To the emulsion were added 3 g of basic lead silicate, 13 of titanium dioxide, 0.3 g of carbon, 3 g of clay, 2 g of dibutyltin oxide and 1 g of a nonionic surfactant [Noigen EA-142B (trade name), a product of Daiichi Kogyo Seiyaku Co., Ltd.] (all the amounts are per 100 g of the resin solid content of the emulsion). The mixture was subjected to dispersion of components by the use of a ball mill until the particle sizes became 10µ or smaller, followed by dilution with deionized water until the resin solid content became 15%. Thus, a cationic electrodepositable coating (I-b) for comparison was obtained.

Production of aqueous coatings (M-1) and (S-1)

Production of acrylic resin aqueous dispersion (W-1)

In a reactor were fed 140 parts of deionized water, 2.5 parts of 30% Newcol 707SF (see Note 1 below) and 1 part of the following monomer mixture (1). They were stirred in a nitrogen atmosphere. Thereto was added, at 60° C. in 4 hours by the use of a metering pump, a monomer emulsion consisting of 79 parts of the following monomer mixture (1), 4 parts of 3% ammonium persulfate and 42 parts of deionized water. Then, aging was conducted for 1 hour.

To the reactor were fed 20.5 parts of the following monomer mixture (2) and 4 parts of 3% ammonium persulfate simultaneously but in parallel at 80° C. in 1.5 hours. Then, aging was conducted for 1. Thereafter, filtration through 200-mesh nylon cloth was conducted at 30° C. To the filtrate was added deionized water, and the mixture was adjusted to pH 7.5 with dimethylaminoethanol to obtain an acrylic resin aqueous dispersion (W-1) having an average particle diameter of 0.1µ, a glass transition temperature (Tg) of 46° C. and a non-volatile content of 20%.

| Monomer mixture (1) | |
|---|---|
| Methyl methacrylate | 55 parts |
| Styrene | 10 parts |
| n-Butyl acrylate | 9 parts |
| 2-Hydroxyethyl acrylate | 5 parts |
| Methacrylic acid | 1 part |
| Monomer mixture (2) | |
| Methyl methacrylate | 5 parts |
| n-Butyl acrylate | 7 parts |
| 2-Ethylhexyl acrylate | 5 parts |
| Methacrylic acid | 3 parts |
| 30% Newcol 707SF (Note 1) | 0.5 part |

(Note 1: 30% Newcol 707SF is a surfactant produced by Nippon Nyukazai Co., Ltd.)

Production of acrylic resin aqueous solution (W-2)

Into a reactor were fed 60 parts of butyl cellosolve and 15 parts of isobutyl alcohol. They were heated to 115° C. in a nitrogen atmosphere. Thereto was added, in 3 hours, a mixture consisting of 26 parts of n-butyl acrylate, 47 parts of methyl methacrylate, 10 parts of styrene, 10 parts of 2-hydroxyethyl methacrylate, 6 parts of acrylic acid and 1 part of azobisisobutyronitrile. Aging was conducted at 115° C. for 30 minutes. Thereto was added, in 1 hour, a mixture consisting of 1 part of azobisisobutyronitrile and 115 parts of butyl cellosolve. Aging was conducted for 30 minutes. Filtration through a 20-mesh nylon cloth was conducted at 50° C. The resulting reaction product had an acid value of 48, a viscosity of Z4 as measured by a Gardner-Holdt bubble viscometer, a non-volatile content of 55% and a Tg of 45° C. The product was neutralized with dimethylaminoethanol in equal equivalents, followed by addition of deionized water to obtain a 50% acrylic resin aqueous solution (W-2).

| Production of metallic aqueous coating (M-1) | |
|---|---|
| Acrylic resin aqueous dispersion (W-1) | 275 parts |
| Acrylic resin aqueous solution (W-2) | 40 parts |
| Cymel 350 (amino resin, a product of Mitsui Toatsu Chemicals, Inc.) | 25 parts |
| Aluminum paste (AW-500B, a product of Asahi Chemical Metals Industry Co., Ltd.) | 20 parts |
| Butyl cellosolve | 20 parts |
| Deionized water | 253 parts |

The above materials of the above proportions were mixed. Thereto was added Thixol K-130B (a thickener, a product of Kyoeisha Chemical Co., Ltd.) and the viscosity of the mixture was adjusted to 3,000 cps as measured by a Brookfield viscometer (rotor rpm=6 rpm) to obtain a metallic aqueous coating (M-1) having a non-volatile content of about 19%.

| Production of white aqueous coating (S-1) | |
|---|---|
| Acrylic resin aqueous solution (W2) | 40 parts |
| Titanium dioxide | 100 parts |
| Butyl cellosolve | 20 parts |

The above materials of the above proportions were dispersed to particle sizes of 5µ or smaller by the use of a pebble mill. Thereto were added the following materials of the following proportions.

| | |
|---|---|
| Acrylic resin aqueous dispersion (W-1) | 275 parts |
| Cymel 350 (amino resin, a product of Mitsui Toatsu Chemicals, Inc.) | 25 parts |
| Deionized water | 111 parts |

The mixture was subjected to viscosity adjustment to 2,500 cps i n the same manner as above, to obtain a white aqueous coating (S-1) having a non-volatile content of about 30%.

Production of powder coating (3-a)

Into a flask were fed 40 parts of methyl methacrylate, 30 parts of 2-ethylhexyl acrylate, 30 parts of glycidyl methacrylate, 10 parts of styrene, 1 part of tert-butyl peroxide (a polymerization intiator) and 2 parts of a potassium oleate soap (a surfactant). They were subjected to thermal polymerization by suspension polymerization. The resulting copolymer (having a glass transition temperature of about 60° C.) was dried. 100 parts of the copolymer, 25 parts of decamethylenedicarboxylic acid and 1 part of a film surface controlling agent were melt-kneaded at 120° C. for 10 minutes by the use of a heated kneader. The kneaded product was cooled and ground by the use of a grinder to obtain a clear powder coating (3-a) having particle diameters of about 20–150µ.

[Examples 4–6 and Comparative Examples 3–5]

A zinc phosphate-treated steel plate (a material to be coated) was immersed in a cationic electrodepositable coating and subjected to electrodeposition with a counter electrode used as an anode, for 3 minutes at a voltage which gave a coating film (as cured) of 20µ. The electrodeposited plate was washed with water and then heated at 170° C. for 20 minutes in an atmosphere containing 10 ppm of nitrogen dioxide, to cure the electrodeposited film. Thereon was coated, as a first top coat, an aqueous coating (M-1) or (S-1) by the use of a spraying gun (Devilbiss SGA 502, 25° C., humidity×70%) so as to give a film (as cured) of 10–20µ (in the case of M-1) or 25–40µ (in the case of S-1). Then, drying was conducted under the curing conditions shown in Table 2. Thereon was coated, as a second top coat, a powder coating by electrostatic powder coating so as give a film (as cured) of 70–100µ. Then, drying was conducted under the curing conditions shown in Table 2. The details of the above coating operations and the evaluations of the above-obtained coating systems are shown in Table 2.

TABLE 2

| | | | Examples | | | Comparative Examples | | |
|---|---|---|---|---|---|---|---|---|
| | | | 4 | 5 | 6 | 3 | 4 | 5 |
| Coating operation | Electrodeposition coating | Symbol of coating | 1-a | | | 1-b | | |
| | | Curing conditions | 170° C. × 20 min | | | 170° C. × 20 min | | |
| | Intermediate coating | Symbol of coating | — | — | — | — | — | Conventional type (*1) |
| | | Curing conditions | — | — | — | — | — | 140° C. × 30 min |
| | Top coating | Base coat (aqueous coating) Symbol | M-1 | M-1 | S-1 | M-1 | M-1 | M-1 |
| | | Curing conditions | 80° C. × 10 min | 120° C. × 30 min | 80° C. × 10 min | 80° C. × 10 min | | |
| | | Clear coat (powder coating) Symbol | | 3-a | | Conventional type (*2) | 3-a | Conventional type (*2) |
| | | Curing conditions | | 150° C. × 30 min | | | 150° C. × 30 min | |
| Evaluation | Flat portion finishing (*3) | | 1.0≦ | 1.0≦ | 1.0≦ | 0.7 | 1.0≦ | 1.0≦ |
| | Exposure durability (*4) | | ○ | ○ | ○ | X | X | ○ |
| | Chipping resistance (*5) | | ○ | ○ | ○ | X | △ | ○ |
| | VOC (volatile organic compound) level (*6) | | ○ | ○ | ○ | X | ○ | X |
| | Times of curing (yardstick of energy saving) (*7) | | 2.5 | 3.0 | 2.5 | 2.5 | 2.5 | 3.5 |

Notes for Table 2

(*1) Intermediate coating of conventional type

This is an intermediate coating of solvent-based based amino-alkyd resin type. It was coated on the cured film of electrodepositable coating, by the use of a spray coater so as to give a coating film of 30µ as cured, and then cured at 140° C. for 30 minutes.

(*2) Top coating of conventional type

This is a clear coat of organic solvent-based thermosetting acrylic resin type (Magicron HK-1, a product of Kansai Paint Co., Ltd.). It was coated on the uncured film of base coat [aqueous coating (M-1)] so as to give a coating film of 40µ as cured, followed by heating at 150° C. for 30 minutes to simultaneously cure the previously-formed base coat film and the newly-formed clear coat film.

(*3) Flat portion finishing

Measured by the use of a portable distinctness-of-image-gloss meter (PGD-IV Model, a product of JAPAN COLOUR RESEARCH INSTITUTE ). A larger value indicates cares better distinctness of image gloss.

(*4) Exposure durability

A coated plate was exposed to 200-hour accelerated exposure in a sunshine weatherometer (light amount=1, 100K Joule/m$^2$.hr), followed by immersion in water of 40° C. for 24 hours. This test (1 cycle) was conducted 25 times (25 cycles). On the resulting coated plate were formed 100 squares of 2 mm×2 mm by cutting, a tape was adhered thereon, and the tape was peeled, in accordance with JIS K 5400 8.5.2 (cross-cutting, followed by tape adhesion and peeling). The degree of peeling of the squares was rated by the following yard-stick.

○: No peeling between individual coating films.

X: Partial or complete peeling between electrodeposited coating film and base coat film.

(*5) Chipping resistance
The following test was conducted.
(1) Tester: Q-G-R Gavelometer (Q Panel Co.)
(2) Size of stones sprayed: crushed stones of about 15–20 mm in diameter
(3) Volume of stones sprayed: about 500 ml
(4) Pressure of spraying air: about 4 Kg/cm$^2$
(5) Temperature during test: about 20° C.

A test piece was fixed to a holder therefor; crushed stones of about 500 ml were hit against the test piece at an air pressure of about 4 kg/cm$^2$; and the coating film surface of the test piece was observed visually and rated according to the following yardstick.

○ (good): Part of the top coating had very slight damage caused by hitting impact, but the electrodepositable coating film showed no peeling.

△ (slightly poor): The top coating and the intermediate coating had damage caused by the hitting impact and, moreover, the electrodepositable coating film showed slight peeling.

X (poor): The top coating and the intermediate coating had severe damage caused by the hitting impact and, moreover, electrodepositable coating film showed considerable peeling.

(*6) VOC (volatile organic compound) level
Coating of first top coat and second top coat was conducted as follows.
Film thickness
First top coat:
15μ
Second top coat:
15μ (powder coating containing no solvent)
40μ (solvent type)
Coating efficiency
First top coat:
37% (aqueous)
75% (solvent type, electrostatic spraying)
Second top coat:
95% (powder, electrostatic spraying)
95% (solvent type, electrostatic static spraying)

When the VOC per gallon of total solid amount of coating films exceeded 12.2 lb set by the EPA (Environmental Protection Agency) of U.S., the VOC was rated as X; and when said VOC did not exceed said level, the VOC was rated as ○.

(*7) Times of curing (yardstick of energy saving)
Times of curing was calculated by counting each curing made at a temperature higher than 100° C., as 1.0 time and each curing made at a temperature not exceeding 100° C., as 0.5 time.

What is claimed is:

1. A cationic electrodepositable coating composition comprising:

[I] A polyurethane-modified epoxy resin-amine adduct obtained by a reaction of:

(A) a polyurethane compound having one terminal isocyanate group and at least one blocked isocyanate in the molecule, obtained by a reaction of (a) a polyhydroxy compound having a number-average molecular weight of 50–8,000, (b) a polyisocyanate compound, and (c) a compound for blocking an isocyanate group, which has one active hydrogen atom in the molecule, (B) a bisphenol epoxy resin having at least two epoxy groups in the molecule, and (C) an active-hydrogen-containing amine compound, and [II] a nonionic film-forming resin.

2. The composition according to claim 1, wherein the polyhydroxy compound (a) has a number-average molecluar weight of 50–6,000.

3. The composition according to claim 1, wherein the polyhydroxy compound (a) is selected from the group consisting of ethylene glycol, propylene glycol, 1,6-hexanediol and N-methyldiethanolamine.

4. The composition according to claim 1, wherein the polyisocyanate compound (b) is selected from the group consisting of aliphatic, alicyclic or aromatic-aliphatic polyisocyanate compounds.

5. The composition according to claim 1, wherein the polyisocyanate compound (b) is selected from the group consisting of hexamethylene diisocyanate, isophorone diisocyanate and hydrogenated 4,4'-diphenylmethane diisocyanate.

6. The composition according to claim 1, wherein the compound (c) having one active hydrogen atom in the molecule is selected from the group consisting of a monohydric alcohol, a monocarboxylic acid, a monohydric thiol, a secondary amine, an oxime and a compound obtained by converting, into an aldimine, a ketimine, oxazoline or imidazoline, the primary amino group of an amine compound having one secondary amino or hydroxyl group and one or more primary amino group.

7. The composition according to claim 1, wherein the compound (c) having one active hydrogen atom in the molecule has a molecular weight of 30–2,000.

8. The composition according to claim 1, wherein the polyurethane compound (A) is obtained by a reaction of 10–94% by weight of the polyhydroxy compound (a), 5–80% by weight of the polyisocyanate compound (b) and 1–85% by weight of the compound (c) having one active hydrogen atom in the molecule, all of said amounts being based on the total amount of (a), (b) and (c).

9. The composition according to claim 1, wherein the polyurethane compound (A) has a number-average molecular weight of 400–10,000.

10. The composition according to claim 1, wherein the bisphenol epoxy resin (B) is a diglycidyl ether of a bisphenol compound.

11. The composition according to claim 10, wherein the diglycidyl ether of a bisphenol compound is a diglycidyl ether of bisphenol A represented by the following formula

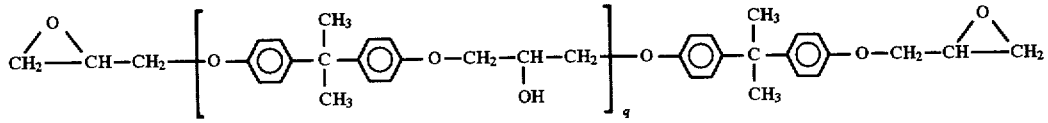

wherein q is an integer of 2–20.

12. The composition according to claim 1, wherein the bisphenol epoxy resin (B) has a number-average molecular weight of about 310–10,000 and epoxy equivalents of about 155–5,000.

13. The composition according to claim 1, wherein the active-hydrogen-containing amine compound (C) is selected from the group consisting of a compound obtained by converting, into an aldimine, a ketimine, oxazoline or imidazoline, the primary amino group of an amine compound having one secondary amino group and one or more primary amino groups, a secondary monoamine, and a compound obtained by converting, into a ketimine, the primary amino group of an alkanolamine.

14. The composition according to claim 13, wherein the active-hydrogen-containing amine compound (C) is diethanolamine or a ketimine made from diethylenetriamine.

15. The composition according to claim 1, wherein the polyurethane-modified epoxy resin-amine adduct [I] is obtained by reacting the secondary hydroxyl group of the bisphenol epoxy resin (B) with the polyurethane compound (A) and then adding, to the terminal oxirane group of the resulting polyurethane-modified epoxy resin, the active-hydrogen-containing amine compound (C).

16. The composition according to claim 1, wherein the polyurethane-modified epoxy resin-amine adduct [I] is obtained by a reaction of 16–80% by weight of the polyurethane compound (A), 20–80% by weight of the epoxy resin (B), and the active-hydrogen-containing amine compound (C) of such an amount that the resulting polyurethane-modified epoxy resin-amine adduct has an amine value of 15–100.

17. The composition according to claim 1, wherein the polyurethane-modified epoxy resin-amine adduct [I] has a number-average molecular weight of 1,000–20,000.

18. The composition according to claim 1, wherein the polyurethane-modified epoxy resin-amine adduct [I] contains a primary hydroxyl group in an amount of 600–1,000 equivalents.

19. The composition according to claim 1, wherein the nonionic film-forming resin [II] has a number-average molecular weight of about 3,000–100,000 and has, in the molecule, a nonionic functional group such as hydroxyl group, capable of crosslinkable with the blocked isocyanate group of the resin [I] or with an external curing agent during the baking and curing of said composition coated.

20. The composition according to claim 1, wherein the nonionic film-forming resin [II] is selected from the group consisting of an acrylic resin, a polyester resin, a polyester-grafted nonionic acrylic resin, an acrylic resin-grafted nonionic polyester resin and a silicone-modified resin which is obtained by modifying an acrylic, polyester or alkyd resin with an organopolysiloxane resin.

21. The composition according to claim 20, wherein the nonionic film-forming resin [II] is a polyester-grafted nonionic acrylic resin wherein the amount of the polyester grafted is 5–80% by weight based on the total of the resin.

22. The composition according to claim 1, wherein the weight ratio of the resin [I]/the resin [II] is 30/70 to 90/10.

* * * * *